Oct. 22, 1935.  W. J. HOGG  2,018,523
FORMING AND MILLING TOOL FOR DIES
Filed March 16, 1934   2 Sheets-Sheet 1
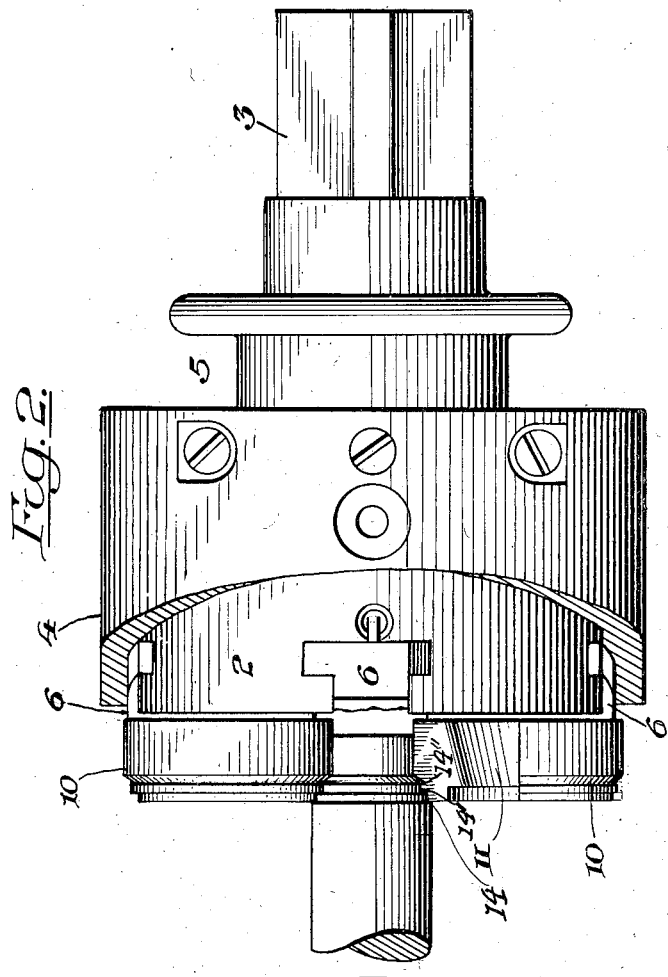
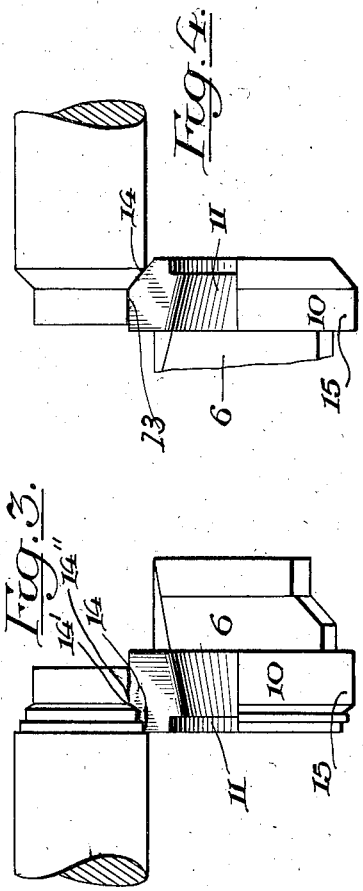
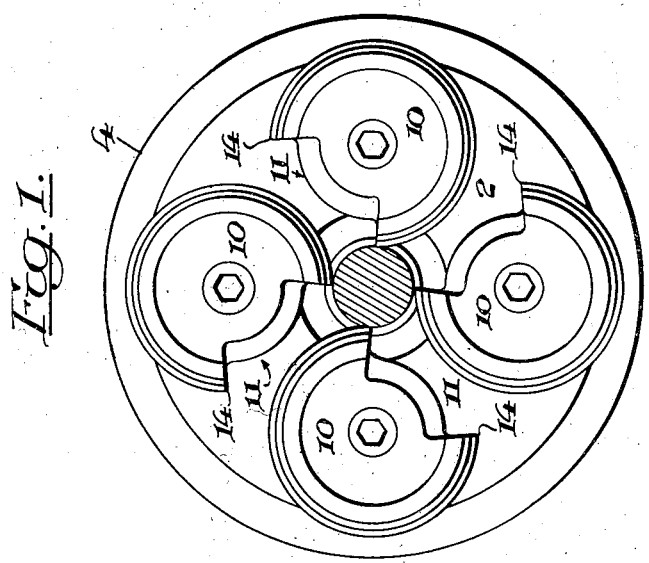
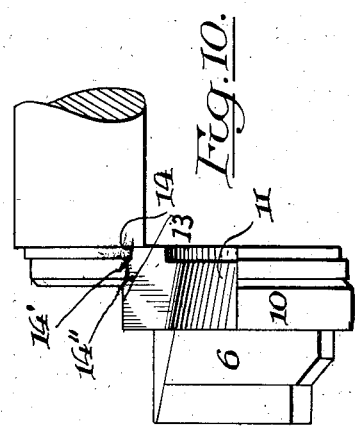
Inventor.
William J. Hogg
by his Attorney Oct. 22, 1935.    W. J. HOGG    2,018,523
FORMING AND MILLING TOOL FOR DIES
Filed March 16, 1934    2 Sheets-Sheet 2
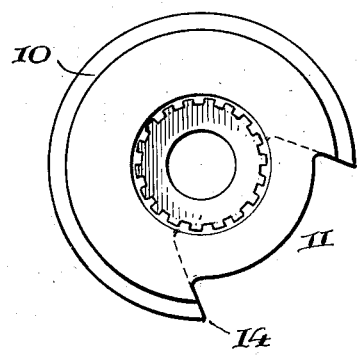
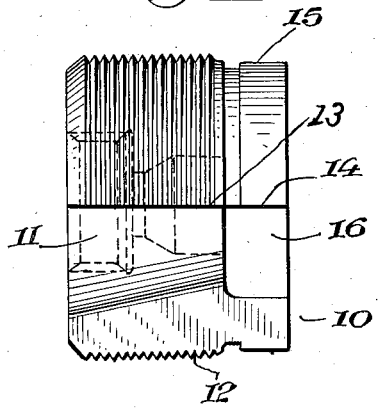
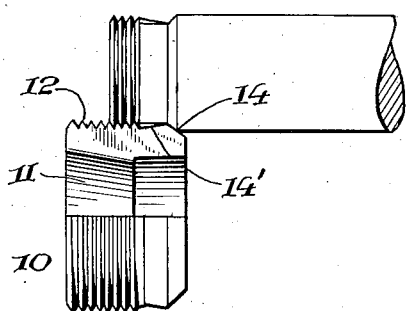
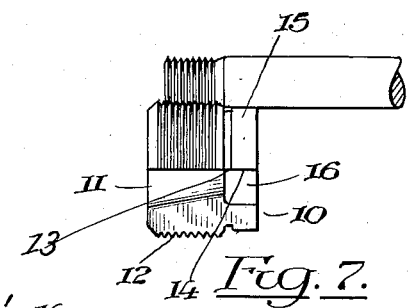
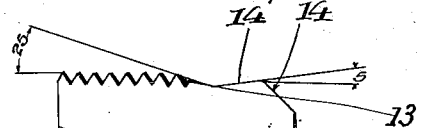
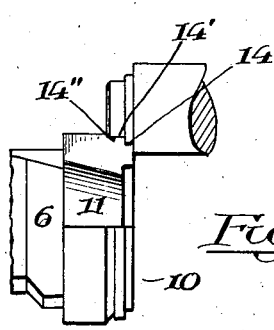
Inventor
William J. Hogg
by his Attorney Patented Oct. 22, 1935

2,018,523

UNITED STATES PATENT OFFICE 2,018,523

FORMING AND MILLING TOOL FOR DIES

William J. Hogg, Cleveland, Ohio, assignor to The National Acme Company, Cleveland, Ohio, a corporation of Ohio Application March 16, 1934, Serial No. 715,878

9 Claims. (Cl. 82—20)

This invention relates to automatic dies adapted for use with automatic metal working machines such as single spindle and multiple spindle screw machines, more particularly, however, to improved turning, forming or milling tools adapted to be carried by such dies, the object of the invention being to provide an improved die or die head having a series of circular cutters of improved form, usually four in number and which may be used for turning, forming or milling the work and, in certain forms thereof, may also be used for threading the work.

A further object of the invention is the provision of improved circular cutters for use in a die or die head adapted to engage the work axially of the die.

In the drawings accompanying and forming a part of this specification, Fig. 1 is a front view of a die and illustrating four of the improved turning or forming tools in position.

Fig. 2 is a side view of the die partly broken away and illustrating a piece of work in position to be operated upon.

Fig. 3 illustrates a cutter formed so as to hollow mill a piece of work in one operation and also the stock rod in juxtaposition to the cutter.

Fig. 4 is a sectional view of one form of turning tool in juxtaposition to the work.

Fig. 5 is a front view and Fig. 6 is a side view of a combined circular turning tool and chaser.

Fig. 7 illustrates the cutting tool shown in Figs. 5 and 6 in juxtaposition to the work.

Fig. 8 is a view illustrating a combined cutting tool and chaser particularly adapted for heavy work, for instance where it is necessary to remove $\frac{1}{16}$" or more from the bar.

Fig. 9 illustrates the tool shown in Fig. 8 in juxtaposition to the work or stock rod, and Figs. 10 and 11 illustrate other forms of cutting tools which may be used in the die head.

Similar characters of reference indicate corresponding parts in the several views.

Before explaining in detail the present improvement and mode of operation thereof, I desire to have it understood that the invention is not limited to the details of construction and arrangement of parts illustrated in the accompanying drawings since the invention is capable of other embodiments, and that the phraseology which I employ is for the purpose of description and not of limitation.

In all of these improved circular forming, turning or milling tools, it will be understood that they may be used either to turn the work or stock rod or to both turn and thread the same and that they are particularly adapted for use in an automatic die or die head such as those shown and described in my contemporaneously pending application Serial Number 459,700, filed June 7th, 1930, now Patent No. 1,952,205, dated March 27, 1934, and assigned to The National Acme Company, the owner of the present improvement, and reference is made to that case for a detailed description of the construction of the die itself and the manner of supporting the turning tools therein, the cutting tools of that application being in the form of threading cutters and commonly called chasers and when the present cutters are in the form of both turning tools and chasers, they will have straight grooves instead of spiral forming grooves, in which case, however, the chasers are so set in the die that they have all the advantages of the spiral grooves without any of their disadvantages.

The present improvement disclosed in Figs. 1 to 4 and 11 is a division of my contemporaneously pending application, Serial Number 609,113, filed May 4th, 1932, now Patent No. 1,978,427, dated October 30, 1934, while that disclosed in the other figures is a continuation of said application and as the improvement has primarily to do with the circular turning cutters, a brief description only is deemed necessary of the rest of the die which, in the main may be similar to those heretofore manufactured by The National Acme Company and in the present instance, comprises a slotted body 2 having a shank 3 for attachment to the tool spindle holder of the machine.

Upon this shank body is located a shiftable cap or housing 4 having a grooved collar 5 by means of which the cap may be shifted in the usual way by the means provided for that purpose in the machine. The cap 4 and the cutter carrying blocks 6 are provided with suitable cam faces and the die is provided with adjusting screws for adjusting the cutters to the proper diameter of the work which is received axially of the die so that the series of four cutters will operate on the periphery of the work or stock rod as the die passes on to the rod, this die being usually carried by a suitable slide.

In other words, it will be observed that each of the cutters is secured to the die head in such manner that its axis is concentric to the axis of the die and, therefore, to the work and is spaced laterally from the axis of the die and of the work.

The cutters are thus suitably positioned and guided by means of the blocks by receiving slots or recesses carried at the front face of the die body. Each of the cutters 10, whatever the form thereof, is substantially circular but with a segment or sector 11 thereof removed and when provided with a chaser or threading portion, this is formed of substantially circular parallel grooves 12 and these grooves terminate in a depthwise cutting edge 13.

The circular chaser is turned and ground on a slight taper on the outside diameter to allow the proper clearance and guide for the chaser angle, the diameter at the front being less than that at the rear of the chaser with the result that the front portion of the chaser does the cutting while the rear portion guides or pulls the chaser on to the work with the grooves acting as a guide except on chasers used for tapered threads where the full width of the chaser is engaged when cutting the thread.

For some classes of work, this taper may be reversed and in others, the chaser may be ground on a straight line.

The formation of the chasers and location thereof insofar as they have to do with the threading of the work is similar to that shown in said contemporaneously pending applications and, therefore, a detailed description is not deemed necessary herein. Serrated bushings are used, as set forth for the mounting of the chasers on the chaser blocks.

Each cutter in the present improvement has its forward end shaped to provide one or more cutting or turning portions 14, various forms of which, according to the work to be done are shown in the drawings and these cutting portions first engage the work or stock bar whereby it is shaped or turned as illustrated in the several different figures and then when the cutter is provided with threading grooves is also threaded.

In several of the figures a series of cutting portions, one behind another are shown as at 14, 14′ and 14″, arranged in step formation according to the shape of the shoulders or other work to be formed. In Fig. 9, two such cutting portions 14 and 14′ are shown while in Figs. 4 and 5, only one, 14, is shown. Thus, each cutter is formed with one or more circumferentially arranged shoulders conforming to the shape of the work after it is cut and each shoulder terminates at the depthwise extending cutting edge 13 formed by the removed sector 11 in a cutter 14, 14′ or 14″ specially shaped to cut the desired formation in the stock bar.

In some instances, as for instance, in the form of cutter shown in Figs. 5, 6 and 7, the front portion 14 of the cutter can be used to turn the bar before threading as where rough stock is used or a larger diameter of work is to be threaded to the correct diameter or the front band portion 15 of the cutter can be used to steady the bar to insure concentricity of the thread with the work.

In Figs. 10 and 11 a circular cutting tool adapted to turn two different diameters of shoulders is shown while Figs. 8 and 9 illustrate a form of turning tool adapted for heavy work in combination with a threading surface for threading the work.

Each of the cutters is provided with a forwardly extending plain portion or band 15 forming a chambered portion 16 and each cutter has a segmental or sector portion thereof cut away as hereinbefore explained and the forward extension of the cutter formed by this chambered portion permits the formation of the cutting edge hereinbefore referred to, thus permitting the work to be cut or turned and then threaded when it is provided with threading surfaces.

The cutting edge can be ground to suit any angle or shape to be made and, as before explained, the cutters may be formed so as to take deep cuts or small cuts or form one or more shoulders in the work.

Each cutter is set on an inclined block and this gives the face of the tool some clearance so that when grinding it is only necessary to grind the face of each tool and both the hollow mill section and chaser section when this is used are ground ready to operate.

Thus, in the present improvement, I have provided a circular cutting tool adapted to be carried by a threading die which will not only cut or turn the work but, if desired, also thread the work subsequent to such cutting and all in one operation, thus materially reducing the cost of the product since heretofore it has been necessary to cut the work on one part of the machine and then thread it on another part, referring particularly to a multiple spindle screw machine whereas, in the present improvement the work may be turned, in other words, various forms of shoulders may be provided thereon and then, if desired, may also be threaded by this improved cutting tool.

It is to be understood that, by describing in detail herein any particular form structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. An automatically operative tool for use in an automatic multiple or single spindle screw machine to operate on the exterior of a stock bar and comprising a body, a series of blocks circularly arranged and carried by said body, and a series of circularly located cutters, each axially supported on a block for automatic radial opening and closing movement and adjustment and each comprising a shankless circular disk having a sector removed to provide spaced opposed edges depthwise of the disk, one of said opposed edges at the front part of the disk having a plurality of differently formed or positioned adjoining cutting portions effective to differently form the work around the exterior of the stock bar and of decreasing diameter relative to the body of the disk.

2. An automatically operative tool for use in an automatic multiple or single spindle screw machine to operate on the exterior of a stock bar and comprising a body, a series of blocks circularly arranged and carried by said body, and a series of circularly located cutters, each axially supported on a block for automatic radial opening and closing movement and adjustment and each comprising a shankless circular disk having a sector removed to provide spaced opposed edges depthwise of the disk, one of said opposed edges at the front part of the disk having a plurality of differently formed or positioned adjoining cutting portions effective to cut or turn a plurality of shoulders on the exterior of the stock bar and of decreasing diameter relative to the body of the disk.

3. An automatically operative tool for use in an automatic multiple or single spindle screw machine to operate on the exterior of a stock bar and comprising a body, a series of blocks circularly arranged and carried by said body, and a series of circularly located cutters, each axially supported on a block for automatic radial opening and closing movement and adjustment and each comprising a shankless circular disk having a sector removed to provide spaced opposed edges depthwise of the disk, one of said opposed edges at the front part of the disk having a cutting portion effective to cut or turn a shoulder on the exterior surface of the stock bar.

4. An automatically operative tool for use in an automatic multiple or single spindle screw machine to operate on the exterior of a stock bar and comprising a body, a series of blocks circularly arranged and carried by said body, and a series of circularly located cutters, each axially supported on a block for automatic radial opening and closing movement and adjustment and each comprising a shankless circular disk having a sector removed to provide spaced opposed edges depthwise of the disk, one of said opposed edges at the front part of the disk having a cutting portion effective to hollow mill the stock bar.

5. An automatically operative tool for use in an automatic multiple or single spindle screw machine to operate on the exterior of a stock bar and comprising a body, a series of blocks circularly arranged and carried by said body, a series of circularly located shankless cutters, each axially supported on a block for radial opening and closing movement and adjustment, and means for automatically opening and closing said cutters, each of said cutters comprising a circular disk having a sector removed to provide spaced opposed edges depthwise of the disk, one of said opposed edges at the front part of the disk constructed to hollow mill or turn or form the stock bar.

6. An automatically operative tool for use in an automatic multiple or single spindle screw machine to operate on the exterior of a stock bar and comprising a body and a series of equidistantly disposed cutters supported for automatic radial opening and closing relative to the work, each comprising a shankless circular disk having a single sector thereof removed to provide opposed axially extending edges, one of said edges having at its forward end a plurality of adjoining successively increasing in diameter step-formed cutting portions effective to hollow mill or form one or more shoulders on a stock bar.

7. An automatically operative tool for use in an automatic multiple or single spindle screw machine to operate on the exterior of a stock bar and comprising a body and a series of equidistantly disposed cutters supported for automatic radial opening and closing relative to the work, each comprising a shankless circular disk having a single sector thereof removed to provide opposed axially extending edges, said disk having an axial opening and therearound a chamber having a diameter greater than said opening thereby forming a forwardly extending flange, one of said edges having at its forward end one or more cutting portions effective to hollow mill or form one or more shoulders on a stock bar.

8. A die for use with automatic single or multiple spindle screw machines and comprising a body, a series of automatically radially shiftable shankless circular cutters mounted on said body, means for shifting them, each cutter comprising a circular disk having a sector thereof removed to form opposed spaced edges and having circumferentially located adjoining stepped portions, each terminating at one of said edges in a cutting portion for cutting a stock bar with different diametered portions.

9. A die for use with automatic multiple spindle screw machines and comprising a body, a series of radially shiftable cutter holding cam-formed blocks carried by said body, means for shifting said blocks radially thereby to open and close the cutters carried by said blocks relative to the work piece, means for adjusting said blocks radially thereby to position the cutters to varying diameters of work pieces, a series of radially located disk formed cutters carried by the blocks effective to cut the work pieces other than by threading, as by milling during endwise movement of the die on the work pieces during rotary movement of the work pieces or the die or both, each of said cutters having an axial bore therethrough, and means extending through said bore for detachably securing the cutters to the blocks in a radial series around the work piece.

WILLIAM J. HOGG.